United States Patent Office 3,440,528
Patented Apr. 22, 1969

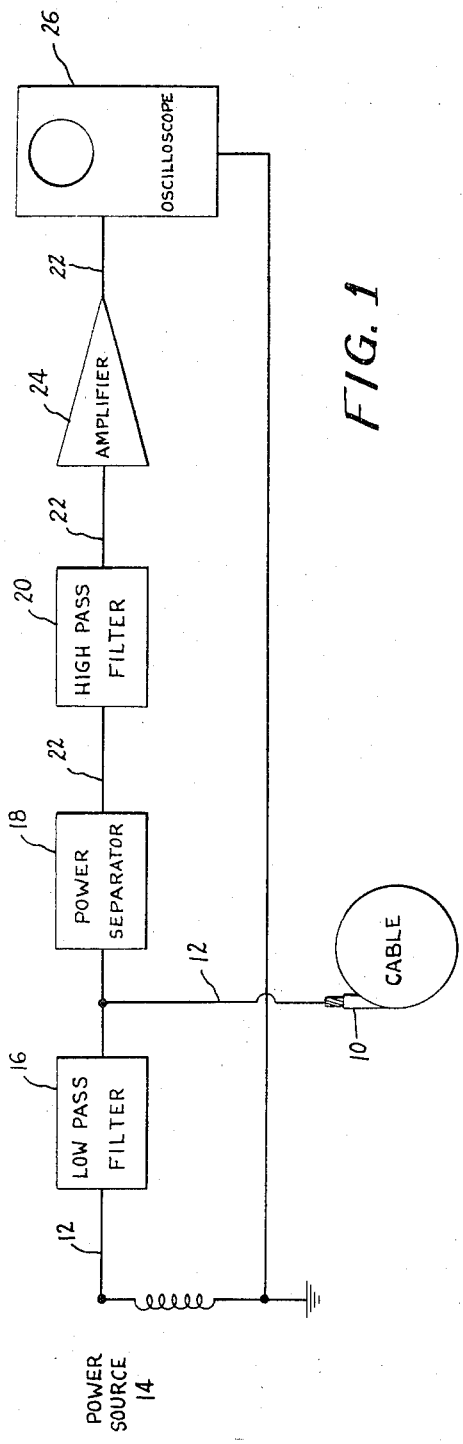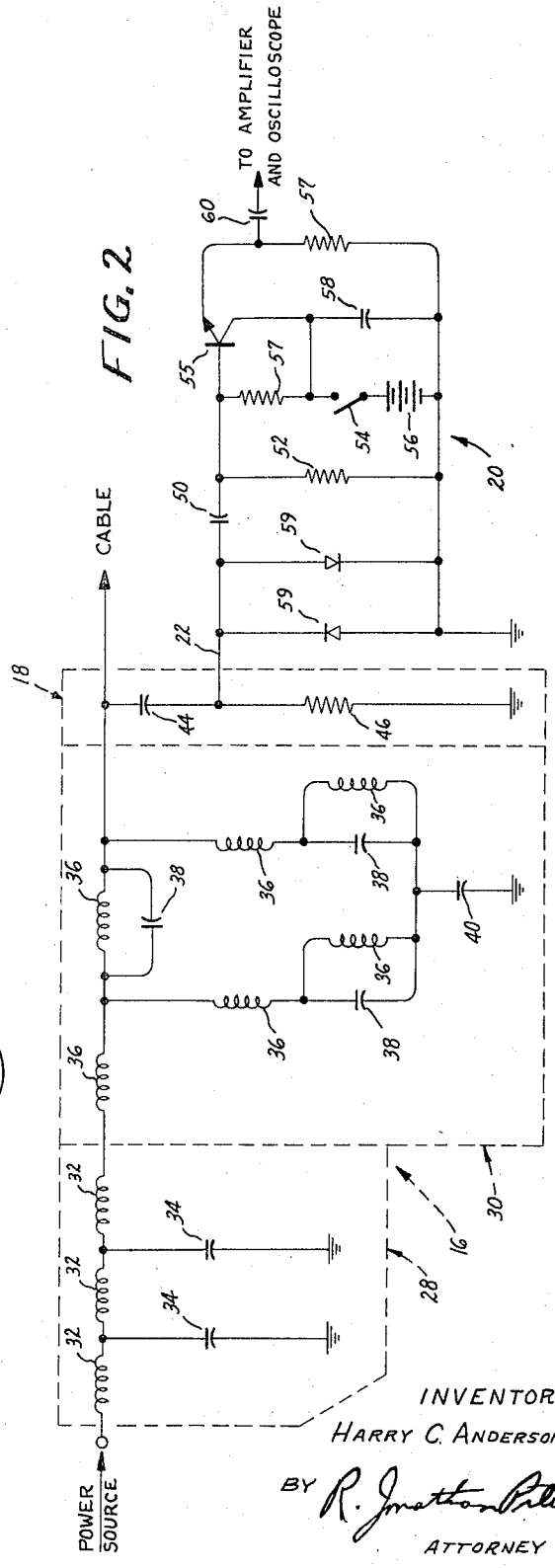

3,440,528
METHOD AND APPARATUS FOR LOCATING VOIDS IN AN INSULATED ELECTRICAL CABLE
Harry C. Anderson, Stratford, Conn., assignor to General Electric Company, a corporation of New York
Filed June 14, 1967, Ser. No. 645,954
Int. Cl. G01r 31/08
U.S. Cl. 324—52    14 Claims

ABSTRACT OF THE DISCLOSURE

In an ionization site locator, power frequency applied from a source to the cable is transmitted through a filter which attenuates higher frequencies. The filter includes means for stepping down the impedance to match the impedance of the cable. The high frequency pulses resulting from ionization at a void site in the cable are separated from the power frequency, and a signal applied by the high frequency pulses is detected by an oscilloscope or other suitable indicator means.

In a typical cable structure of the shielded type, a semiconducting tape is disposed around the metal conductor, and an insulation layer is applied over this surface. A ground shielding means is then concentrically disposed over the insulation, which usually comprises a semi-conducting layer and a metallic return shield. The semi-conducting layer, for example, may be a nylon type impregnated with carbon black, or may be polyethylene or butyl rubber having incorporated therein carbon black. The metallic return shield for returning current may be lead, copper, or tinned copper, wrapped around the semi-conducting layer or may be a copper braid concentrically disposed over said semi-conducting layer. An intercalated cable comprises an interlocking wrap as the shield of a metallic tape (e.g., copper tape) and a paper tape which partly overlap. These shielded structures may be further enclosed by a jacketing material such as a polyvinyl chloride layer or a metallic armour.

In the cable structure, it is important to eliminate or minimize any voids, such as in the insulation or at the interfaces, which potentially are a source of dielectric failure. That is, under high voltage conditions encountered, the voids may ionize thereby leading to the eventual failure of the cable. Cable is tested for voids by an ionization level test, and the voltage level at which ionization occurs in the cable coincides with the visual display on an oscilloscope or other suitable instrument calibrated to detect an electrical discharge of known magnitude.

Where the ionization level test has indicated a cable failure, it is important to be able to locate the void sites in the full length of the cable so as to remove from the cable the void and to improve manufacturing methods. Several methods have been devised for scanning the incomplete or non-shielded cable. However, experience has shown that ionization or void sites may exist at the interface between the insulation and the shielding means, and therefore it is important to provide a means for locating void sites in the shielded structure, including completed cable with a protective jacket. According to one method proposed by F. H. Kreuger in Discharge Indication in High Voltage Equipment, American Elsevier Publishing Co., Inc., 1964, travelling waves are used to locate ionization discharges or pulses in the cable. The discharges form two travelling waves which propagate from the void site to the ends of the cable. The forward going travelling wave is coupled to the detector by a power separator or take-off circuit to separate the power frequency from the pulse frequency. The backward going wave is reflected from the far end of the cable and also is coupled to the detector by the power separator. The time difference between the two waves measured by a suitable detector determines the distance to the void site from the end of the cable. However, in practice the external electrical noise level such as found in the power supply will interfere with the signal on the detector. Kreuger merely suggests the use of a filter to attenuate this noise, but discloses no details as to how to block these disturbances. Moreover, I have found that with an intercalated cable, the travelling wave in the cable is rapidly attenuated to below the noise level and consequently no pulse would be discernible on the detector.

This invention has as its purposes to provide an ionization site locator utilizing the travelling wave concept and including in its system a filtering means for effectively matching two broadly separated impedances whereby the void site may be located in a cable of the shielded type, including an intercalated cable.

These together with other objects and advantages of the present invention will best be understood by referring to the following detailed description and preferred embodiments thereof and to the accompanying drawings in which FIGURE 1 is a diagrammatic view of the apparatus suitable for carrying out the invention, and FIGURE 2 is a schematic showing the general type of circuit used in the system of this invention.

In its broad aspect, the invention comprises an ionization site locator for locating faults or voids in an insulated electrical cable of the shielded type. Power frequency from a suitable source is applied to the cable and is transmitted through a filter connected intermediate to the power source and the cable. Frequencies higher than the power frequency such as resulting from external electrical noise and other disturbances are substantially attenuated by the filter. The filter includes first and second sections, and the first section is designed to match the impedance of the cable at power frequency. The second section of the filter includes means to step down the impedance of the circuit whereby the output impedance of the second section matches the impedance of the cable at high frequencies. The match in impedance at high frequencies results in a more efficient attenuation of the frequency components outside the passband of the filter, and further inhibits high frequencies resulting from ionization at a void site from passing through the filter. A separator means separates the power frequency from the high frequency pulses resulting from ionization at a fault or void site, and the high frequency pulses are preferably transmitted to an amplifier means to amplify the frequency pulses within the passband of the separator. The high frequency pulses are then transmitted to an oscilloscope or other suitable detector means which responds to the signal applied thereby rendering a characteristic trace on the oscilloscope.

It will be observed that two wave fronts are formed when a void is ionized in an electrified cable and propagate from the void to the ends of the cable. The forward wave at the detector end of the cable initiates or triggers the oscilloscope trace. The back wave reflects from the far end of the cable and propagates back along the cable to the detector and deflects the oscilloscope trace. The time delay between the waves is indicated by the oscilloscope trace and is a measure of the void location in the cable, as explained in greater detail hereinbelow.

The impedance of the cable at power frequency and at high frequency may be readily derived from the geometry of the cable. The filter circuit connected between the power source and the cable attenuates high frequencies (i.e., external electrical noise) and effects a match in two broadly separated impedances, as described hereinafter in greater detail. Matching is required in order to obtain efficiency in attenuating such undesired frequencies. As you digress from a match in the impedance, there is a corresponding loss in efficiency of attenuation. It will be observed that for each cable structure undergoing testing, it would be impractical to employ a different filter system to achieve an exact match, or substantially exact match, in impedance. The term "match" as used herein and in the appended claims refers therefore to an effective match to obtain suitable attenuation within practical and operable limits, and is not restricted to the meaning of exact counterpart.

There is shown diagrammatically in FIGURE 1 apparatus suitable for carrying out the invention. The cable 10 to be tested for void sites is connected at one end to line 12 and the other end is terminated so as to be substantially ionization free, as by known conventional means. For example, when the mercury cup in oil is used as in the ionization level test, one terminal is inserted into an electrically energized cup of mercury submersed in oil, the other terminal is inserted into a container of oil, and the shielding means (e.g., copper tape) is connected to ground. A suitable power source 14 such as a high potential transformer having one terminal grounded, supplies power to the line 12. Low pass filter 16 transmits the power frequency emanating from the power source to the cable 10 while substantially attenuating higher frequencies, e.g., external electrical noise. Ionization occurs at a void site emitting high frequency pulses which are transmitted to power separator 18 where they are separated from the power frequency. Preferably, the high frequencies are first transmitted through a high pass filter 20 which further attenuates the power frequency. In addition, the high pass filter matches the impedance from the cable at high frequencies with that of the transmission line 22 leading to the detector with a minimum loss of high frequencies and without distortion. Amplifier means 24, preferably a pre-amplifier, connected to transmission line 22 amplifies the high frequency pulses within the passband of the high pass filter which are then transmitted to the oscilloscope 26.

Referring now to FIGURE 2 there is shown schematically a circuit diagram for operating the system of this invention. Power frequency applied from the power source enters the low pass filter 16 which comprises a first section 28 and a second section 30 each having one or more inductors and one or more capacitors. The impedance of the cable at power frequency is known, and the low pass filter is designed to effectively match this impedance by providing the proper values of inductance and capacitance. Therefore, the first section 28 of the low pass filter, having inductors 32 and capacitors 34 of proper design value, is operated at power frequency to transmit power frequency while substantially attenuating higher frequencies, e.g., noise frequencies. The second section 30 of the low pass filter likewise comprises inductors 36 and capacitors 38 and also capacitor 40 connected to ground, all of proper design value. The input at the terminal of the second section matches the impedance of the first section in order to provide for the best attenuation of external electrical noise. When the second section is transmitting the low frequency current or power frequency, the reactance of capacitor 40 is relatively high and therefore the second section is substantially isolated from ground. As a result, the impedance at the output of the low pass filter matches the impedance of the cable at power frequency.

As a practical matter, undesired high frequencies (e.g., noise frequencies) are not completely attenuated by the first section 28 of the low pass filter. These frequencies are transmitted to the second section 30 of the low pass filter simultaneously with the power frequency. In order to more efficiently suppress these high frequency disturbances from the power supply so as to reach the detector where they would interfere with the high frequency pulses emanating from a void in the cable, it is necessary to match the impedance of the low pass filter 16 at its output to the impedance of the cable at high frequency. To accomplish this, the impedance at the input of the second section is stepped down to match the impedance of the cable at high frequency. The low impedance of the cable at high frequency can be mathematically derived from the geometry of the cable. Therefore, the values for the inductors and capacitors for the second section 28 of the low pass filter can be calculated from the load resistance at high and low frequencies. Preferably, impedance is stepped down by the geometric mean of the input impedance to the output impedance to prevent a discontinuity in impedance which will cause a reflection of the travelling wave emanating from the void site. At high frequency, capacitor 40 exhibits a low reactance. Therefore, the second section of the filter is grounded through capacitor 40, and the impedance is stepped down as the current is transmitted to the output of the second section so that the impedance of the filter 16 at its output matches the cable at high frequency. Further, the second section attenuates the high frequency disturbances transmitted with the power frequency.

The low pass filter 16 thus has the function of matching two broadly separated impedances. First, there is a match to high impedance at power frequency so that the impedance in the filter matches the impedance in the cable load. Secondly, there is a match to low impedance at high frequency so that the cable exhibiting a low impedance at high frequency matches the low impedance output of the filter. As a consequence, the noise frequencies are substantially attenuated. In addition, because the filter effects a match in impedance at high frequencies, the filter resists the transmission of high frequency pulses resulting from ionization in the cable which therefore largely pass toward the detector.

The high frequency pulses emanating from a void site in the cable are then passed to a power separator 18, comprising a capacitor 44 and resistor 46 connected in series. Here the high frequency pulses resulting from ionization at a void in the cable are separated from the power frequency. These high frequencies are then transmitted by a line 22 to the high pass filter 20 comprising one or more capacitors 50 and resistors 52 which attenuate the power frequency. Desirably, the high pass filter includes an emitter-follower 54 having a transistor 55 powered by battery 56, and including resistors 57 and by-pass capacitor 58, for supplying power gain to transmit the high frequency pulses through the transmission line to the oscilloscope. In order to protect the transistor, the high pass filter may include protective diodes 59 which by-pass any high voltage surges to ground. A coupling capacitor 60 is provided to transmission line 22 to isolate the DC circuit of the emitter-follower from the amplifier.

The high frequency pulses are then transmitted through a suitable amplifier means 24 and then to an oscilloscope 26 where the pulse signal is detected. The high frequency pulses typically are at a low voltage level and therefore a pre-amplifier, which has a low noise input, is preferred as the amplifier means 24 in order to obtain sufficient amplification without deteriorating the signal to noise ratio. The time delay between the forward wave and the reflected wave is indicated by the oscilloscope trace and is a measure of the void location in the cable.

In testing the cable for void sites, the cable is connected to the power source such as by the procedure described above. The electrical length of the cable is first determined by applying at the far terminus a pulse from a pulse generator. The electrical length is effectively longer than its physical length by the reciprocal of the velocity of propagation. That is, the electrical length equals the physical length multiplied by the reciprocal of the velocity of propagation. A signal from the applied pulse is traced on the oscilloscope. The forward signal or wave initiates the trace followed by the reflected signal or wave, which has travelled twice the length of the cable, and the length of oscilloscope trace between the two signals defines the electrical length of the cable. The pulse generator is then disconnected, and the ionization test voltage is then applied to the cable. When ionization occurs at a void site, a forward signal is obtained on the oscilloscope trace coinciding with the forward signal obtained in determining the electrical length, and a single peak resulting from the reflected pulse is also obtained on the trace. From a comparison of the picture on the oscilloscope showing the electrical length and the single peak, the time delay for the ionized void may be determined. The distance to the void site from the end of the cable may be determined from the following formula:

$$d = \frac{t_o - t_v}{t_o} \times L$$

where $t_o$ equals the pulse generator time delay, $t_v$ equals the ionized void time delay, and L equals the length of the cable. A camera attachment (not shown) may be employed to photograph the oscilloscope trace.

I claim:

1. A system for locating voids in an insulated electrical cable of the shielded type comprising, in combination:
   (a) a power source connected to said cable for transmitting electrical current at power frequency;
   (b) filter means, including first and second sections, connected intermediate said power source and said cable;
   (c) said first and second sections transmitting said current at power frequency while substantially attenuating the external electrical current at higher frequencies than said power frequency;
   (d) said first section including means to match the impedance of the cable at power frequency, and said second section including means to step-down the input impedance from the first section to the second section to match the impedance of said cable at high frequency established by a pulse emanating from a void in said cable;
   (e) means connected to the output of said second section to separate said high frequency pulses emanating from a void in said cable from said power frequency; and
   (f) detector means connected to said separator means and responsive to the high frequency pulses.

2. A system according to claim 1 wherein the impedance is stepped down by the geometric mean of the input impedance to the output impedance.

3. A system according to claim 1 wherein said step-down means includes a capacitor connected to ground whereby said step-down means at low frequency is substantially isolated from ground and at high frequency is effectively grounded.

4. A system according to claim 1 wherein said separator means includes a second filter means connected to said detector means to transmit the high frequency pulses while substantially attenuating power frequency.

5. A system according to claim 1 and including an amplifier means for amplifying the high frequency pulses transmitted to said detector means.

6. A system according to claim 1 wherein said separator means includes a second filter means connected to said detector means to transmit the high frequency pulses while substantially attenuating power frequency, and a pre-amplifier for amplifying the high frequency pulses within the passband of said second filter means transmitted to said detector means.

7. A system according to claim 1 wherein said detector means is an oscilloscope.

8. A system for locating voids in an insulated electrical cable of the shielded type comprising, in combination:
   (a) a power source connected to said cable for transmitting electrical current at power frequency;
   (b) filter means, including first and second sections, connected intermediate said power source and said cable;
   (c) said first and second sections transmitting said current at power frequency while substantially attenuating the external electrical current at higher frequencies than said power frequency;
   (d) said first section including means to match the impedance of the cable at power frequency, and said second section isolated from ground by a capacitor whereby said second section is effectively grounded at high frequency to step-down the input impedance from the first section to the second section to match the impedance of said cable at high frequency established by a pulse emanating from a void in said cable;
   (e) means connected to the output of said second section to separate said high frequency pulses emanating from a void in said cable from said power frequency;
   (f) second filter means connected to said separator means to transmit the high frequency pulses while substantially attenuating the electrical current at power frequency;
   (g) a pre-amplifier connected to said second filter means for amplifying the high frequency pulses within the passband of said second filter means; and
   (h) detector means connected to said pre-amplifier and responsive to the high frequency pulses.

9. A system according to claim 8 wherein the impedance is stepped down by the geometric means of the input impedance to the output impedance.

10. A method for locating voids in an insulated electrical cable of the shielded type comprising, in combination:
    (a) transmitting electrical current at power frequency through a filter to said cable while substantially filtering out higher frequencies;
    (b) matching the impedance of the filter at power frequency to the impedance of the cable, and simultaneously matching the impedance of the filter at high frequency to the impedance of the cable;
    (c) separating the power frequency from the high frequency pulses resulting upon ionization at a void site in said cable, said pulses propagating from the void site and forming a forward and reflected pulse; and
    (d) obtaining spaced signals from a forward pulse and reflected pulse.

11. A method according to claim 10 and including passing the high frequency pulses through a filter while attenuating power frequency.

12. A method according to claim 10 wherein said signals are amplified.

13. A method according to claim 10 wherein the impedance at power frequency is matched to the impedance at high frequency by the geometric mean step-down of the input impedance to the output impedance.

14. A method for locating voids in an insulated electrical cable of the shielded type comprising, in combination:
    (a) transmitting electrical current at power frequency through a filter to said cable while substantially filtering out high frequencies;
    (b) matching the impedance of the filter at power frequency to the impedance of the cable, and simultaneously stepping down the input impedance to match the impedance of the filter at high frequency to the impedance of the cable;
    (c) separating the power frequency from the high frequency resulting upon ionization at a void site in said cable and forming a forward and reflected pulse;
    (d) passing the high frequency pulses through a second filter while attenuating electrical current at power frequency;

(e) amplifying the high frequency pulses within the passband of said second filter; and
(f) obtaining spaced signals from a forward pulse and reflected pulse.

References Cited

UNITED STATES PATENTS

| | | | |
|---|---|---|---|
| 2,602,834 | 7/1952 | Leslie et al. | 324—52 |
| 2,800,627 | 7/1957 | Oudin et al. | 324—52 |
| 2,887,652 | 5/1959 | Bendayan et al. | 324—52 XR |
| 3,156,865 | 11/1964 | Lamont | 324—52 XR |
| 3,244,978 | 4/1966 | Craven et al. | 324—52 |
| 3,281,674 | 10/1966 | Landgraff | 324—52 |

OTHER REFERENCES

Kreuger, Discharge Detention in High Voltage Equipment, 1965, American Elsevier Publishing Co. Inc. pp. 92–105.

RUDOLPH V. ROLINEC, *Primary Examiner.*

G. R. STRECKER, *Assistant Examiner.*